United States Patent [19]

Van Elven et al.

[11] Patent Number: 4,605,504

[45] Date of Patent: Aug. 12, 1986

[54] CHROMATOGRAPHIC SEPARATION OF METALS WITH POLYETHERURETHANE PARTICLES

[75] Inventors: Aris Van Elven, Leersum; Henricus G. J. Overmars, Nijbeets, both of Netherlands

[73] Assignee: Nederlandse Centrale Organisatie voor Toegepast-Natuurwetenschappellijk Onderzoek, The Hague, Netherlands

[21] Appl. No.: 730,422

[22] Filed: May 6, 1985

Related U.S. Application Data

[62] Division of Ser. No. 485,418, Apr. 15, 1983, abandoned.

[30] Foreign Application Priority Data

Apr. 21, 1982 [NL] Netherlands .................. 8201654

[51] Int. Cl.$^4$ .............................................. B01D 15/08
[52] U.S. Cl. ................................ 210/656; 210/198.2; 210/502.1; 55/67; 55/386; 75/101 BE; 423/139; 423/DIG. 14
[58] Field of Search ...................... 423/139, DIG. 14; 75/101 BE; 210/656, 657, 658, 659, 682, 688, 672, 502.1, 198.2, 198.3; 55/67, 386; 524/839; 528/52, 73, 62

[56] References Cited

U.S. PATENT DOCUMENTS

| | | | |
|---|---|---|---|
| 3,148,173 | 9/1964 | Axelrood | 525/440 |
| 3,281,397 | 10/1966 | Axelrood | 528/62 |
| 3,294,724 | 12/1966 | Axelrood | 528/62 |
| 3,410,817 | 12/1968 | McClellan | 528/62 |
| 3,424,772 | 1/1969 | Moshier | 210/656 |
| 3,655,627 | 4/1972 | Hutzler | 528/64 |
| 3,905,929 | 9/1975 | Noll | 524/839 |

*Primary Examiner*—Ernest G. Therkorn
*Attorney, Agent, or Firm*—Brumbaugh, Graves, Donohue & Raymond

[57] ABSTRACT

The invention relates to polyetherurethane particles having absorptive activity whereby these particles may be applied for the extractions or the separations of metal ions from liquids, e.g. from waste liquors leaving galvanizing, printing and metal working industries. The particles are of a spherical shape, have a bulk density of at least 0.5 g/cm$^3$ and are resistant against acidic liquids.

The invention provides a method for such extractions and separation.

The invention provides also a method for production of the polyetherurethane particles by forming a prepolymer and subjecting the dissolved prepolymer in the presence of 2-methylpiperazine suspension to polycondensation.

6 Claims, No Drawings

CHROMATOGRAPHIC SEPARATION OF METALS WITH POLYETHERURETHANE PARTICLES

This application is a division of application Ser. No. 485,418, filed on Apr. 15, 1983, now abandoned.

The invention relates to polyetherurethane particles having absorptive activity, to a method of preparing said particles as well as a method for the extraction or separation of metals from liquids by employing said particles.

A similar method is known from DE-A- No. 2,628,483 disclosing the preparation of non-foamed polyurethane particles either porous or not. The preparation of polyurethane to be employed in accordance with this German Offenlegungsschrift is performed by blending an appropriate diol or polyol with a diisocyanate and incorporation in acetone, then boiling the mixture while stirring for some time and cooling. Thereafter, irregularly shaped particles are obtained by shaking with water.

The known particles have a bulk density of from 0.25–0.5 g/cm$^3$.

The known polyurethane particles are employed for the removal of phenolic substances and weak carboxylic acids from water. However, such a particles are not resistant to aggresive media like hydrochloric acid, iron chloride and the like.

There has now been found a method of preparing polyether urethane particles having absorptive activity characterized by reacting a polyalkylene oxide having a molecular weight of at least 500 with a diisocyanate in a way known per se to form a prepolymer and then subjecting a solution of the prepolymer to polycondensation in the presence of a substantially equivalent amount of piperazine or 2-methylpiperazine in an aqueous medium as a suspension. Generally these compounds are used in a ratio of from 1:1 to 1:4. One mole of piperazine or 2-methylpiperazine per 2 equivalent of reactive isocyanate in the prepolymer is appropriate. The particles obtained are of a spherical shape such being beneficial in view of the packing of the column. The particles do not stick to one another, are very stable and exhibit a bulk density of more than 0.5 g/cm$^3$ upon drying. A high bulk density is conducive to a much better absorption in the column, because there occurs less longitudinal mixing and moreover because a larger amount of material may be bound per unit of volume.

Moreover, the invention relates to a method for the extraction or the separation of metals from liquids by flowing said liquids over a column filled with the polyetherurethane particles obtained in accordance with the invention and thereafter optionally eluting the absorbed metals in a way known per se.

It is very surprising that the formation of polyetherurethane in a suspension in water by the addition of piperazine or 2-methylpiperazine yields a non-sticking, spherically shaped product, the more so as aliphatic diamines, substituted diamines, aromatic phenylene diamines and guanidine do not exhibit such an effect.

The method for purifying waste liquors is of particular importance to galvanizing, printing and metal working industries where one may remove now iron from waste liquors in a simple manner whereas the commonly used method for the removal of iron requires a liquid/liquid extraction first, which may lead to great difficulties in practice, if an emulsion is formed. Likewise the method may be suitably employed for strongly acidic solutions. It is however, particularly appropriate for flowing solutions having a normality of from 3–8 over the column.

In the method according to the invention the polyetherurethane particles may be prepared starting from a polyalkylene oxide having a molecular weight of at least 500, though it is preferred, however, to use a polyalkylene oxide having a molecular weight of 1000. The polybutylene oxides Polymeg 1000 and 2000 are most appropriate. No particular requirements apply to the diisocyanates to be used though it is preferred to use tolylene diisocyanate (80 percent by weight 2,4 and 20 percent by weight 2,6).

When employing prepolymers including 2 equivalents of isocyanate per mole it is possible to utilize part of these radicals for the incorporation of additional polyol.

In this case however, it proved to be necessary to extend the post polymerization in order to prevent the product from sticking together. A post polymerization in a flat bed whereby contact between the particles was reduced to a minimum for a period of 16 hours yielded good particles.

The best results are obtained by adding to the prepolymer solution a catalyst like N-ethylmorpholine, triethylamine or diaminodicyclooctane in the suspension condensation. The amount of piperazine may then be reduced to half thereof ($\frac{1}{4}$ mol per equivalent of reactive isocyanate), while the absorption of Fe$^{III}$ is increased.

EXAMPLES I–IX

The prepolymer to be used in accordance with the invention was prepared as follows:

986 g of polybutylene oxide (Polymeg 1000) (Quaker Furan) were dissolved in 1800 ml of benzene or tolylene. About 500 ml of benzene or tolylene were distilled off at normal pressure, thus azeotropically distilling off the water present. This was repeated by adding 300 ml of dry benzene or tolylene and distilling off again. Upon cooling down 354 g of tolylene diisocyanate (80:20 percent by weight of 2,4 and 2,6 blend Desmodur T80) (Bayer) as well as 10.4 g of dibutyl tin dilaurate were added. The mixture was heated at 55°–60° C. for 4 hours. The prepolymer solution obtained comprised 8.41 meq of free NCO per g.

The suspension condensation of this prepolymer was conducted as follows: a beaker having a capacity of 800 ml was filled with 400 ml of water to which 2 drops of Tween 60 (surface active agent) had been added. Thereupon agitations took place by means of an anchor agitator while adding 70 g of the prepolymer solution described above. The specific density of the solution was adjusted to by the addition of carbon tetrachloride. The agitator speed was selected such that a sufficiently fine emulsion could be formed. After a lapse of 30 sec. a solution of 14 mmole of the diamine to be investigated in 10 ml of water was added. After stirring for 30 minutes the agitator speed was reduced to 60 a.p.m. and a solution of 14 mmole of diamine was added again. After stirring for 1 hour the suspension consisting of fine spheres was stored for 90 hours. Thereafter it was filtered, washed with water and dried on the air. The yield is quantitative.

The particles were tested with respect to the iron binding capacity and the behavior as a column material (performance).

For that purpose a chromatographic column having an inner diameter of about 7.5 mm was filled with 10 g of the above specially shaped particles as a slurry in water. After the formation of the adsorption column 6 M HCl was passed downward from above. Thereby the void volume was calculated from the break through volume of the HCl solution. Upon addition of the HCl solution a 2% FeCl$_3$-solution in 6 molar HCl is passed. The Fe$^{III}$-absorption is calculated from the breakthrough volume of the iron solution. (The breakthrough volume is the total amount of a solution passing the column before the solution leaves the column unchanged. In case of the absorption of iron the break through volume will be larger than the void volume. The iron absorption may be calculated from the difference).

Table A discloses the results of a number of diamines tested. If it has been indicated that the column properties are bad, sticking together, channeling, shrinkage or hold-up may have occurred. If the table under "result of the condensation" indicates sticking together the material aggregates while agitating.

TABLE A

Prepolymer: Polymeg 1000/T80 ½
additive: several diamines (conc. ½ mole per eq. of reactive isocyanate benzene /CCl$_4$ solution).

| Example | Amine | Result of the condensation | Column property | % by weight of iron bound |
|---|---|---|---|---|
| I | ethylene diamine | sticking together | | |
| II | hexamethylene diamine | particles | bad | 0.1 |
| III | 3-(2-aminoethyl) amino-propyl amine | particles | bad | 1.0 |
| IV | piperazine | particles | good | 6.6 |
| V | 2-methyl piperazine | particles | good | 5.8 |
| VI | trans 2,5-dimethyl piperazine | sticking together | | |
| VII | N—(2-aminoethyl) piperazine | particles | bad | 4.1 |
| VIII | guanidine | sticking together | | |
| IX | none | sticking together | | |

It is evident from table A that the best results are obtained with piperazine and 2-methyl piperazine.

EXAMPLES X-XIX (The utilization of different types of polyether glycol)

Several commercialized polyether glycols were tested with respect to the usefulness as a base material for iron absorbing particles.

At first the polyethers were converted into the prepolymer while using per 1 mole of polyether 2 moles of a diisocyanate (yet 5% by weight of diisocyanate being added additionally). Three different diisocyanates were tested. The prepolymers were prepared in accordance with the method described in examples I-IX; toluene was used as the solvent.

Piperazine was used as the amine (0.5 mole per equivalent of reactive isocyanate) and the product was tested with respect to the column properties and the iron absorption in the manner described in examples I-IX. The results are given in table B.

TABLE B

| Example | Polyol | Diisocyanate | Result of the condensation | Column property | % by weight of iron bound |
|---|---|---|---|---|---|
| X | Pluriol 3100[1] | Desmodur T80[5] | sticking together | | |
| XI | PPG 420[2] | Desmodur T80[5] | particles | bad | 0.0 |
| XII | Polymeg 650[3] | Desmodur T80[5] | sticking together | | |
| XIII | Polymeg 1000 | Desmodur T80[5] | particles | good | 6.6 |
| XIV | Polymeg 2000 | Desmodur T80[5] | particles | good | 6.9 |
| XV | Desmophen 7135Z[4] | Desmodur T80[5] | sticking together | | |
| XVI | Polymeg 1000 | Desmodur 44[6] | coarse particles | bad | 0.0 |
| XVII | Polymeg 1000 | Desmodur L[7] | coarse particles | bad | 0.0 |
| XVIII | Polymeg 1000 90% Pluriol 3000 10% | Desmodur T80 | particles | good | 6.6 |
| XIX | Polymeg 1000 75% Pluriol 3100 25% | Desmodur T80 | particles | good | 6.1 |

[1]Propylene oxide ethylene oxide copolymer BASF.
[2]Polypropylene oxide Huls.
[3]Polybutylene oxide Quakers Furan.
[4]Bayer.
[5]Tolylene diisocyanate (80:20% by weight of 2,4 and 2,6 blend) Bayer.
[6]4,4'-diisocyanatophenyl methane Bayer.
[7]Bayer.

It was found that the polybutylene oxides Polymeg 1000 and 2000 in combination with tolylene diisocyanate 80/20 2,4 and 2,6 (Desmodur T80) were the most appropriate. Although particles were obtained when using polypropylene glycol but no iron was bound and the column properties were bad. When utilizing diphenylene methane diisocyante instead of tolylene diisocyanate there were formed coarse particles which were not capable of binding iron either. By means of Pluriol (comprises hydrophilic radicals), Polymeg 650 (short chains) and Desmophen 7135Z no particles could be obtained. Blends of Polymeg 1000 and Pluriol 3100 yielded good products though not better than Polymeg 1000 as such.

EXAMPLES XX-XXXIII

Examples X and XV were repeated using, however, an excess of diisocyanate (enhances the cross linking in the particles). In these examples 1% by weight (based on the solution) of lead naphthenate was used as a catalyst while employing toluene in this case as the solvent too.

It is evident from the table that the addition of diisocyanate in excess is conducive to a general improvement of the particle formation. The iron absorption, however, is low or completely absent.

TABLE C

| Example | Prepolymer | NCO-bound/ NCO-free ratio | Result of the condensation | Column property | % by weight of iron bound |
|---|---|---|---|---|---|
| XX | Pluriol 3100/T80 | 1:0.09 | sticking together | | |
| XXI | Pluriol 3100/T80 | 1:1.18* | particles | bad | 0.0 |
| XXII | Desmophen 7135Z/T80 | 1:0.009 | sticking together | | |
| XXIII | Desmophen 7135Z/T80 | 1:0.50* | particles | very bad | |
| XXIV | Desmophen 7135Z/T80 | 1:1.00* | particles | very bad | |
| XXV | Polymeg 1000/T80 | 1:0.07 | particles | | 7.3 |
| XXVI | Polymeg 1000/T80 | 1:0.25* | particles | | 0.3 |
| XXVII | Polymeg 1000/T80 | 1:0.59* | particles | | 2.5 |
| XXVIII | Polymeg 1000/Desmodur 44 | 1:0.50** | particles | | 0.1 |
| XXIX | Polymeg 1000/Desmodur 44 | 1:1.0** | particles | | 0.3 |
| XXX | Polymeg 2000/T80 | 1:0.17 | particles | | 6.9 |
| XXXI | Polymeg 2000/T80 | 1:1.33* | particles | | 0.0 |
| XXXII | Polymeg 1000/T80 90% Pluriol PE 3100 10% | 1:0.07 | particles | | 6.6 |
| XXXIII | Polymeg 1000/T80 90% Pluriol PE 3100 10% | 1:0.64* | particles | | 0.5 |

*Desmodur T80 in excess
**Desmodur 44 in excess

EXAMPLES XXXIV-XXXVIII

Spherically shaped material having a different polyether glycol to isocyanate content ratio.

Where prepolymers having two equivalents of isocyanate per mole are used it is possible to incorporate additional polyol.

The method described in the preceding examples was employed including, however, a post polymerization in a flat bed for a period of 16 hours.

The properties of the products obtained are given in table E.

TABLE E

Prepolymer: Polymeg 1000/T80 in toluene
additive: piperazine, 50 mole % based on the free isocyanate radicals.

| Example | Polyol | Mole % of polyol | Result of the condensation | Column property | % by weight of iron bound |
|---|---|---|---|---|---|
| XXXIV | none | | particles | good | 6.6 |
| XXXV | Polymeg 1000 | 25 | particles | rather good | 5.0 |
| XXXVI | Lutensol ED 310[1] | 25 | particles | rather good | 7.2 |
| XXXVII | Lutensol ED 310[1] | 10 | particles | moderate | 4.9 |
| XXXVIII | Desmophen | 25 | particles | bad | 1.8 |

TABLE E-continued

Prepolymer: Polymeg 1000/T80 in toluene
additive: piperazine, 50 mole % based on the free isocyanate radicals.

| Example | Polyol | Mole % of polyol | Result of the condensation | Column property | % by weight of iron bound |
|---------|--------|------------------|----------------------------|-----------------|---------------------------|
|         | 3400   |                  |                            |                 |                           |

[1]Lutensol ED 310 = copolymer of propylene oxide and ethylene oxide started from ethylene diamine BASF.
No improvement of the properties was attained by a different isocyanate polyether glycol ratio.

EXAMPLE XXXIX

A beaker having a capacity of 800 ml was filled with 400 ml of water to which 2 drops of Tween 60 had been added and this mixture was stirred by means of an Ultra Turrax agitator at a moderate speed. This was then followed by the addition of 70 g of the prepolymer solution in toluene described in example I to which 0.5 g of diaminodicyclooctane (DABCO) dissolved in 10 ml of ethyl acetate had been added (The DABCO added enhances the reaction of the still remaining terminal isocyanate radicals with $H_2O$ thereby improving the crosslinking in the particles).

The agitating speed was such that a sufficiently fine emulsion resulted. After agitating for 30 seconds a solution of 1.26 g of piperazine in 10 ml of water was added at once. After agitating for still 1 minute the Turrax agitator was replaced by an anchor agitator and agitating was continued at a low speed for 6 hours. The suspension was then left at room temperature for at least 60 hours. The spherical particles obtained were sieved in wet condition, washed with water and the fractions collected. These fractions were dried on the air. The size of the fractions is:

fraction: >212 μm none
fraction: 106–212 μm none
fraction: 63–106 μm 12.5 g corresponds to 34.4%
fraction: 38–63 μm 11.35 g corresponds to 31.2%
fraction: <38 μm 12.5 g corresponds to 34.4%

The column properties are good and the $Fe^{III}$-absorption amounts to 10–11%.

EXAMPLE XL

The application of polyetherurethane particles in separating metals from exhausted ferrichloride pickling baths.

An exhausted ferrichloride pickling bath, analysis: 127 g/l of Fe, 20 g/l of Cu is chlorinated and diluted with 12 M hydrochloric acid 20 g/l of Cu to twice the volume (analysis 64 g/l of Fe (III), 10 g/l of Cu (II), 6 M hydrochloric acid). 18 g of the 38–62 μm polyetherurethane spherical particles were packed into a column. The column bed dimensions are 21.5 cm × 1.65 cm². The bed volume is 36 cm³, the packing density is 0.50 g/cm³. The free volume of the bed is 18 cm³. The column is treated with 20 cm³ of 6 M hydrochloric acid. The superficial flow rate is 1.1 cm/min. The column is loaded with 5 cm³ of the chlorinated and twice diluted pickling bath (0.32 g of Fe, 0.05 g of Cu). After introducing the sample the chromatogram is developed and copper is eluted with 20 cm³ of 6 M hydrochloric acid. Thereafter iron is eluted with 20 cm³ 0.01 M hydrochloric acid, whereby a quantitative separation of copper and iron is attained.

EXAMPLE XLI

The application of polyetherurethane particles in separating metals from metal hydroxide sludge materials 21 g of metal hydroxide sludge, analasis: 30% of dry solids of which 16% of Fe, 7.2%, of Cr, 7.2% of Zn, 4.2% of Cu, 4.2% of Ni and 0.1% of Cd, is dissolved in 20 cm³ of 6 M hyrochloric acid aerated and heated to the boil. 15 g of water are distilled off, so that the hydrochloric acid concentration of the solution is 6 M. In order to remove any coagulated silica gel present the sludge solution is filtered.

A column, packed with 20 g of 38–63 μm polyetherurethane powder has dimensions of 21.5 cm × 1.65 cm², a bed volume of 36 cm³, a packing density of 0.55 g/cm³. The column was treated with 30 cm³ of 6 M hydrochloric acid. The superficial flowrate is 1.0 cm/min. The column is loaded with 2.6 cm³ of the clear sludge solution. Thereby Fe is bound preferentially to the polyetherurethane. The other metals are eluted with 30 cm³ of 6 M hydrochloric acid. A sludge solution free of iron is obtained thereby. The iron bound in the column is eluted with 25 cm³ of 0.01 M hydrochloric acid, whereupon the column is ready for the following cycle of treatment, loading and elution.

EXAMPLE XLII

The application of polyetherurethane particles in separating iron, nickel and cobalt A 2 M potassium thiocyanate solution (60 ml) containing 500 mg of $Fe^{III}$, 500 mg of $Ni^{II}$ and 500 mg $Co^{II}$ is acidified with a concentrated HCl-solution and replenished to 100 ml.

The solution is flowed over the column containig 20 g of polyurethane particles. Thereby the three dissolved metals are bound to the polymer quantitativity whereas the solvent is collected at the bottom of the column and may be re-used.

The absorped metals are eluted with a 0.01 M potassium thiocyanate solution allowing the separate recovery of $Ni^{II}$ first, followed by $Co^{II}$ and finally $Fe^{III}$.

EXAMPLE XLIII

Binding gold to the polyetherurethane particles

A solution of 60 mg of $NaAuCl_4.2H_2O$ in 100 ml 1 M hydrochloric acid is shaken with 1 g of polyetherurethane particles for 1 hour. The solution is filtered and the gold concentration in this solution is determined. From this determination it is apparent that the polymer particles have absorbed 2.2% of $gold^{III}$.

EXAMPLE XLIV

Binding $uranium^{VI}$ to the polyetherurethane particles

Example XLIII is repeated while applying a solution of 1 g of uranyle acetate-dihydrate in 100 ml of 8 M nitric acid which is shaken with 1 g of polyetherurethane particles for one hour. From the uranium$^{VI}$ analysis of the filtered solution it is apparent that the particles have retained 12 percent by weight of uranium$^{VI}$.

We claim:

1. A method for the extraction and separation of metal ions from a liquid sample which comprises
   (a) preparing a chromatographic column containing nonsticky polyetherurethane particles having an absorptive activity, said polyetherurethane particles being prepared by first reacting a polyalkylene oxide having a molecular weight of at least 500 with a diisocyanate to form a prepolymer and subjecting said prepolymer to polycondensation in an aqueous suspension medium in the presence of an equivalent amount of a piperazine compound selected from the group consisting of piperazine and 2-methylpiperazine to form the polyetherurethane particles;
   (b) applying the liquid sample to the column, whereupon the metal ions are absorbed into the polyetherurethane particles; and
   (c) recovering the absorbed metal ions from the polyetherurethane particles by applying an eluant.

2. The method according to claim 1, wherein the piperazine compound is piperazine.

3. The method according to claim 1, wherein the piperazine compound is 2-methylpiperazine.

4. The method according to claim 1, wherein the eluant is acidic.

5. The method according to claim 1, wherein the eluant has a normality of from 3 to 8 as it passes through the chromatographic column.

6. The method according to claim 1, wherein the polyalkylene oxide is polybutylene oxide having a molecular weight of about 1000 and the diisocyanate is tolylene diisocyanate.

* * * * *

UNITED STATES PATENT AND TRADEMARK OFFICE
CERTIFICATE OF CORRECTION

PATENT NO. : 4,605,504
DATED : August 12, 1986
INVENTOR(S) : Aris Van Elven et al It is certified that error appears in the above-identified patent and that said Letters Patent is hereby corrected as shown below:

Col. 1, line 28, "aggresive" should read -- aggressive --.

Col. 2, line 55, after "to" insert -- 1 --. Col. 3, bridging lines 13-14, "break through" should read -- breakthrough --. Col. 7, line 55, "38-62" should read -- 38-63 --. Col. 8, line 49, "quantitativity" should read -- quantitativily --.

Signed and Sealed this

Thirtieth Day of April, 1991

Attest:

HARRY F. MANBECK, JR.

*Attesting Officer*  *Commissioner of Patents and Trademarks*